United States Patent
Schwarz et al.

(10) Patent No.: US 6,922,027 B2
(45) Date of Patent: Jul. 26, 2005

(54) METHOD OF CONTROLLING AN ELECTRIC MOTOR, A SYSTEM FOR CONTROLLING AN ELECTRIC MOTOR AND AN ELECTRIC MOTOR

(75) Inventors: Marcos Guilherme Schwarz, Joinville (BR); Roberto Andrich, Joinville (BR)

(73) Assignee: Empresa Brasileira de Compressores S.A. - Embraco, Joinville (BR)

(*) Notice: Subject to any disclaimer, the term of this patent is extended or adjusted under 35 U.S.C. 154(b) by 0 days.

(21) Appl. No.: 10/363,004

(22) PCT Filed: Aug. 27, 2001

(86) PCT No.: PCT/BR01/00107

§ 371 (c)(1),
(2), (4) Date: Aug. 4, 2003

(87) PCT Pub. No.: WO02/21675

PCT Pub. Date: Mar. 14, 2002

(65) Prior Publication Data

US 2004/0032230 A1 Feb. 19, 2004

(30) Foreign Application Priority Data

Sep. 8, 2000 (BR) .............................. 0004062

(51) Int. Cl.⁷ .............................................. H02P 6/00
(52) U.S. Cl. ........................ 318/254; 318/138; 318/439; 318/809; 388/815
(58) Field of Search ................................ 318/254, 138, 318/439, 809; 388/815

(56) References Cited

U.S. PATENT DOCUMENTS

| 599,643 A | 2/1898 | Smith |
| 4,162,435 A | 7/1979 | Wright .................. 318/138 |

(Continued)

FOREIGN PATENT DOCUMENTS

| BR | 9904253 | 6/2001 |
| JP | 61191290 | 8/1986 |

(Continued)

OTHER PUBLICATIONS

Satoshi Ogasawara and Hirofumi Akagi; *An Approach to Position Sensorless Drive for Brushless dc Motors*; IEEE Transactions on Industry Applications; Sep./Oct. 1991; pp. 928–933; vol. 27, No. 5.

(Continued)

*Primary Examiner*—Rita Leykin
(74) *Attorney, Agent, or Firm*—Alston & Bird LLP

(57) ABSTRACT

A system of controlling an electric motor, a digital method of controlling an electric motor and an electric motor are described. The system of controlling an electric motor of N phases comprises a microcontroller (10), an A/C converter (30) associated to the microcontroller (30), a set of voltage meters ($D_N$) associated to the A/D converter (30), a set of switches ($SW_{2N}$) connected to an electric voltage ($V_{BUS}$) and associated to the microcontroller (30), the microcontroller (30) selectively feeding, by means of at least two switches ($SW_{2N}$) two phases ($F_N$) of the motor (20) with the voltage ($V_{BUS}$) during a period of time ($T_{POS}$), the movement of the motor inducing the electric voltages ($E_N$), the set of meters ($D_N$) measuring the signals of electric voltages ($f_N$) and comparing these voltages with each other to determine the period of time ($T_{POS}$).

One describes also the calculation of a parameter, called H(r), used to adjust the instants of commutation according to the constructive type of the motor. The parameter depends upon the rotation of the motor.

One also foresees the use of a digital filtering technique, to eliminate the effects of the modulation on the control method. The filtering is characterized by the arithmetic mean of the last k samples of each average electric voltage ($f_N$), these samples being synchronized with the period of modulation.

16 Claims, 7 Drawing Sheets

U.S. PATENT DOCUMENTS

| | | | |
|---|---|---|---|
| 4,169,990 A | 10/1979 | Lerdman | 318/138 |
| 4,743,815 A | 5/1988 | Gee et al. | 318/254 |
| 4,912,378 A | 3/1990 | Vukosavic | 318/254 |
| 4,928,043 A | 5/1990 | Plunkett | 318/254 |
| 5,028,852 A | 7/1991 | Dunfield | 318/254 |
| 5,095,254 A * | 3/1992 | Ueki | 318/138 |
| 5,420,492 A | 5/1995 | Sood et al. | 318/809 |
| 5,739,651 A * | 4/1998 | Miyazawa et al. | 318/439 |
| 5,990,643 A * | 11/1999 | Holling et al. | 318/254 |
| 6,838,840 B1 | 1/2005 | Dainez et al. | |

FOREIGN PATENT DOCUMENTS

| | | |
|---|---|---|
| JP | 02032790 | 2/1990 |
| JP | 04193094 | 7/1992 |
| JP | 07222487 | 8/1995 |
| JP | 11098883 | 4/1999 |
| WO | WO-00/22723 | 4/2000 |

OTHER PUBLICATIONS

Kenneth R. Shouse and David G. Taylor; *Sensorless Velocity Control of Permanent–Magnet Sychronous Motors*; IEEE Transactions on Control Systems Technology; May 1998; pp. 313–324; vol. 6, No. 3.

Silverio Bolognani, Robert Oboe and Mauro Zigliotto; *Sensorless Full–Digital PMSM Drive with EKF Estimation of Speed and Rotor Position*; IEEE Transactions on Industrial Electronics; Feb. 1999; pp. 184–191; vol. 46, No. 1.

Nesimi Ertugrul and Paul P. Acarnley; *Indirect Rotor Position Sensing in Real Time for Brushless Permanent Magnet Motor Drives*; IEEE Transactions on Power Electronics; Jul. 1998; pp. 608–616; vol. 13, No. 4.

Copy of International Search Report for PCT/BR01/00107 completed Apr. 9, 2002.

* cited by examiner

METHOD OF CONTROLLING AN ELECTRIC MOTOR, A SYSTEM FOR CONTROLLING AN ELECTRIC MOTOR AND AN ELECTRIC MOTOR

FIELD OF THE INVENTION

The present invention relates to a system for controlling an electric motor of a digital control method for an electric motor, particularly for a Brushless-DC-type, permanent-magnet motor, as well as to an electric motor provided with a digital control system.

DESCRIPTION OF THE PRIOR ART

A Brushless DC type permanent-magnet motor may be actuated without any information referring to its position, thus operating like an induction motor. However, in order to achieve maximum torque and efficiency, the phase currents have to be synchronized with the induced voltages. This can be done either by means of sensors physically coupled to the motor, as for example Hall type, optic sensors, etc., or by observing the induced voltages and/or currents. Coupled sensors have the drawback of adding extra elements to the design of the motor, considerably increasing the final cost. In addition, space limitations and the environment itself to which the motor is subjected may render the use of these types of sensor unfeasible. So, the use of voltage and/or current observers is the best choice in most cases.

Examples of control techniques using voltage and/or current observers may be found in Brazilian patent PI 9904253—SCHWARZ et al, in patents U.S. Pat. No. 4,162,435—WRIGHT, U.S. Pat. No. 4,169.990—LERDMAN, U.S. Pat. No. 4,743,815—GEE et al, U.S. Pat. No. 4,912,378—VUKOSAVIC, U.S. Pat. No. 4,928,043—PLUNKETT, U.S. Pat. No. 5,028,852—DUNFIELD, and U.S. Pat. No. 5,420,492—SOOD, and also in publications of SATOSHI—1991, SHOUSE—1998, ERTUGRUL—1998 and BOLOGNANI—1999.

In WRIGHT one uses an integration technique for determining the moment of commutation. The non-energized winding is integrated, whereby one obtains the magnetic flux, which is compared with a reference value. When the value of the integral exceeds the reference value, commutation is effected, and the value of the integral returns to its initial value. A disadvantage of this technique is the large amount of hardware required for implementing it. The solution is not microprocessed.

In LERDMAN, one uses a technique similar to that presented in WRIGHT. The non-energized winding is integrated and compared with a reference. A disadvantage of this technique is also the large amount of hardware required. The solution is not microprocessed.

In SWARZ one employs a technique using a voltage-value observer constituted by a network, formed by voltage comparators, capacitors and resistors. With this observer one takes the phase voltages, thus forming a virtual neutral (zero of induced voltage), if the system is balanced. The zero is then compared with each phase, generating a signal that is 30° in advance of the current instant of position change. This advance is then compensated for by a network of capacitors, in order to reach the correct instants of position change (commutation). The solution is microprocessed, but it requires many external components.

In GEE one employs a technique of detecting the zero of the induced voltage (zero crossing), wherein one considers a zero the half of the value of the voltage of the DC bar. The voltage in the non-energized winding is compared with the zero. The zero is always reached at 30° from the moment of commutation. In this way, a delay is left after detection to determine the moment of commutation. A cycle formed by resistors, capacitors and comparators is used in the detection process. There is no modulation on the motor speed control. Instead, one used a SCR that controls the voltage of the bus. The solution is microprocessed. A disadvantage of this technique is the need for using voltage comparators. Another disadvantage is that in motors having a reduced number of grooves at the stator (for example 6 grooves+4-pole rotor, 9 grooves +6-pole rotor), the zero crossing has a plane region that makes it difficult to determine the exact moment at which it should occur.

In SATOSHI one also employs a zero-detecting method. In this case, two diodes are used for detection. One diode is connected to each phase. When one phase is not energized, the current of the diode is monitored. The moment at which the current of the diode extinguishes or the moment at which the current begins to circulate through the diode represents the zero of the voltage.

In VUKOSAVIC, the third voltage harmonic of the motor is achieved by means of the sum of the voltages of the phases. The moment of commutation is then determined as a function of the phase angle of the third harmonic. A vantage here is that the signal of the third harmonic does not undergo any distortion in the event of modulation of the voltage on the motor. A disadvantage is the need for accessing the neuter point of the star connection of the motor. The solution is microprocessed, but another disadvantage is the large amount of hardware outside the microprocessor required.

In PLUNIETT, just as in WRIGHT and LERDMAN, one makes the integration of the non-energized phase voltage. The value of this integration, which represents the magnetic flux, is compared with a reference value called Null Point. This point delimits the voltage signal (zero of the voltage). If, for instance, the non-energized phase is on the rise (towards the bus voltage), then the voltage values at the left of the Null Point are considered negative and those at the right they will be positive. In this case, when the process of integrating the voltage is started, the voltage begins to rise negatively until it reaches it maximum negative value at the null point. After the null point, the value of the module of the integral begins to be reduced and the commutation moment occurs when the value of the integral reaches zero. The solution is not microprocessed. One disadvantage here is the large amount of hardware required.

In DUNFIELD, high-frequency signals are injected into the non-energized phase and the resulting peaks are measured. On the basis of the measured values, one determines the moment of commutation.

In SOOD, one uses a method that is quite different from those cited before. Here it is not necessary to ready the voltages in each phase. One merely uses the current that circulates through the DC bus as information. The motor is initially actuated by voltage imposition. The moment of commutation is then adjusted in accordance with the shape of the read current. A microprocessor is used to make the analysis of the current format.

On the market there are also some microprocessors designed for controlling motors, which present peripherals intended for determining the instant of commutation. As examples, one can cite the microcontroller ST72141 from STMicroelectronics and the microcontrollers TMP88PH47, TMP88PH48, TMP88PH49 from Toshiba. All of these microcontrollers utilize the method of detecting the zero for determining the moment of commutation.

In the microcontrollers from Toshiba, the zero is considered half of the value of the voltage of the DC bus, but it needs external comparators, resitors and capacitors for aiding in the detection.

In the microcontroller from STMicroelectronics the zero is the reference itself of the digital circuit. It always needs the presence of modulation on the phases, because the reading of the voltage of the non-energized phase should be made when all the switches of the inverter are open. Only 3 resistors and 3 capacitors are required for aiding in the detection.

BRIEF DESCRIPTION AND OBJECTIVES OF THE INVENTION

In the technique proposed here the voltages in the three phases of the motor are sampled, mathematically treated, summed to a parameter proportional to the velocity of the motor and basically dependent upon the form that constitutes this motor and compared with each other. The result of this comparison determines the moment of commutation of the phases. The moment of commutation may be advanced or delayed by merely changing said parameter via software. The whole part of position controlling and sensing is carried out solely by a Digital Signal Processor or an equivalent circuit, here defined as the assembly of Microcontroller associated to an analog-digital (A/D) converter. The control system and method of the present invention have the objective of eliminating the analog circuits for determining the position of the rotor and seeking the actuation of the motor with the correct angle between the current and the voltage imposed to the windings of this motor, permitting control of this angle by means of a parameter inserted into the software.

Another objective of this invention is to enable one to detect the position of the rotor for quite high powers, even in situations in which the demagnetization ends after 30 electric degrees from the moment of the last commutation, that is to say, after the moment of zero crossing of the voltage in the non-actuated phase.

The method and system also have the objective of embracing a wide range of rotation, permitting full torque from 2% of the maximum rotation (Below this value the voltages at the entrance of the meters are very low). The system and method further have the objective of using only one digital signal processor and three resistive dividers with first-rate RC filters for reading the voltages in the phases of the motor, without necessarily requiring the presence of modulation, for example, PWM (pulse width modulation), of the voltage on the phases.

Another objective of the proposed method and system is to accept trapezoidal forms of induced voltages with a level lower than 120°, which are found when different constructive forms of the motor are employed.

Another objective of the proposed method and system is to accept PWM modulation in the phases of the motor with cyclic ratio of 100%.

A further objective of the proposed method and system is to operate with the control technique by both voltage imposition and current imposition on the windings of the motor.

One of the objectives of the present invention is achieved by means of a method of controlling permanent-magnet electric motor of N phases comprising a microcontroller, a set of voltage meters associated to the microcontroller, a set of switches connected to an electric voltage and associated to the microcontroller, the microcontroller selectively actuating at least one pair of switches, applying a voltage to at least two phases of the motor, the method comprising steps of the microcontroller reading, by means of the set of meters, the signals of the electric voltages corresponding to the feed voltages in the phases of the motor, and the microcontroller comparing the voltages of the phases with each other and with preestablished parameters and actuating at least one new pair of switches, as soon, as the pre-established relationships are satisfied by the voltages.

Another objective of the present invention is achieved by means of a system of controlling a permanent-magnet electric motor of N phases comprising a microcontroller, a set of switches connected to an electric voltage and associated to the microcontroller, the microcontroller selectively actuating at least one pair of switches, applying a voltage to at least two phases of the motor, the system comprising a set of voltage meters associated to the microcontroller, the set of meters being connected to the feed input of the phases of the motor. The microcontroller comprises, stored in its memory, pre-established relationships between the voltages and is capable of comparing the value measured by the meters with the preestablished relationships and actuating at least one more pair of switches in function of the voltages measured by the set.

A further objective of the present invention is achieved by means of a permanent-magnet electric motor of N phases comprising a system capable of synchronizing the phase currents with the induced voltages, which includes a microcontroller, a set of switches connected to an electric voltage and associated to the microcontroller, the microcontroller selectively actuating at least one pair of switches, applying a voltage to at least one set of voltage meters associated to the microcontroller, the set of meters being connected to the feed inputs of the phases of the motor. The microcontroller comprises, stored in its memory, preestablished relationships between the voltages and is capable of comparing the value measured by the meters with the preestablished relationships and actuating at least one more pair of switches in function of the voltages measured by the set.

A further objective of the present invention is achieved by means of a method of controlling the position of the rotor of a permanent-magnet electric motor of N phases, the motor being fed by a set of switches selectively commuted by a microcontroller, the method comprising the utilization of a parameter called H(r) proportional to the constructive factors of the motor, proportional to the rotation of the motor and proportional to the scale factor of the voltage meters to be used as an adjustment factor in the process of comparing the phases to determine the moment of commutation to the maximum combination of switches of the motor.

A further objective of the present invention is achieved by means of a method of controlling a permanent-magnet electric motor of N phases, the motor being fed by a set of switches selectively commuted by a microcontroller, the method comprising the utilization of a digital filtering technique for eliminating distortions caused by the voltage modulation, for example of the PWM type, in the phases of the motor. The filtering technique consists in the arithmetic mean of the last k samples of the voltages measured and being synchronized with the modulation frequency. The rate of sampling is equal to an integer multiple k of the modulation frequency.

BRIEF DESCRIPTION OF THE DRAWINGS

The present invention will now be describes in greater detail with reference to an embodiment represented in the drawing.

DETAILED DESCRIPTION OF THE FIGURES

Figure 1A:
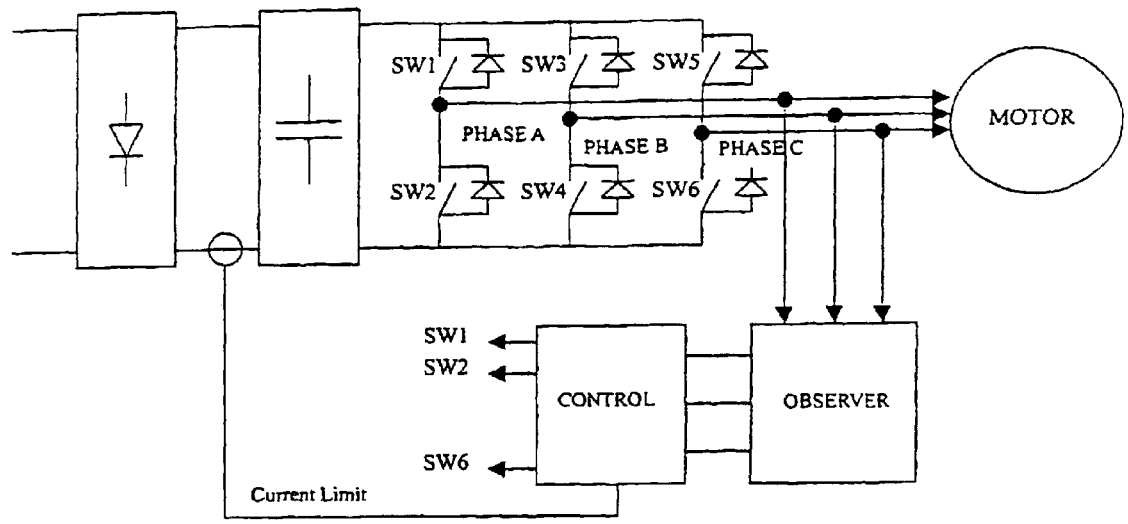
FIG. 1 represents (a) a block diagram of a system for actuating a permanent-magnet Brushless DC type, 4-pole, three-phase motor with trapezoidal voltages of level 120 electric degrees and (b) the respective temporal diagram.
Figure 1B:
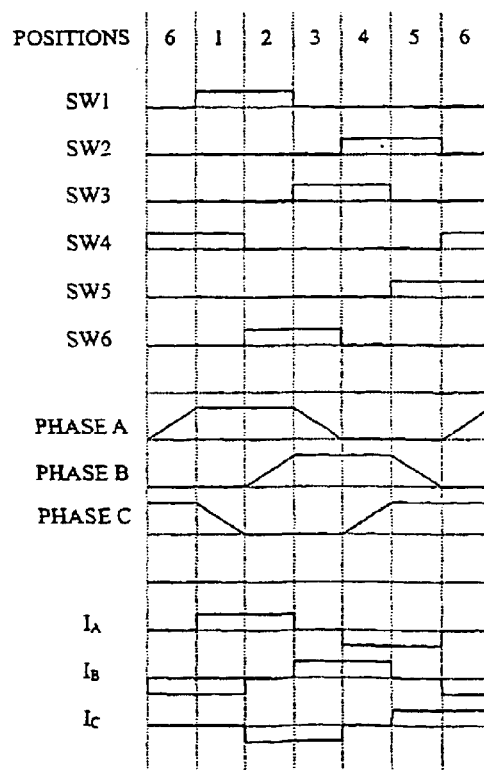

FIG. 1(a) shows the basic configuration of an inverter and (b) the ideal wave shapes existing in the when actuating a Brushless DC type permanent-magnet three-phase 4-pole motor, trapezoidal wave. In normal functioning the control analyzes the input of the voltage and/or current observer and actuates the switches $SW_1, \ldots SW_6$ in the sequence indicated in FIG. 1 according to the position detected. In the event of an overcurrent, indicated by the current observer, the switches are all open for protection of the system.

Figure 7:
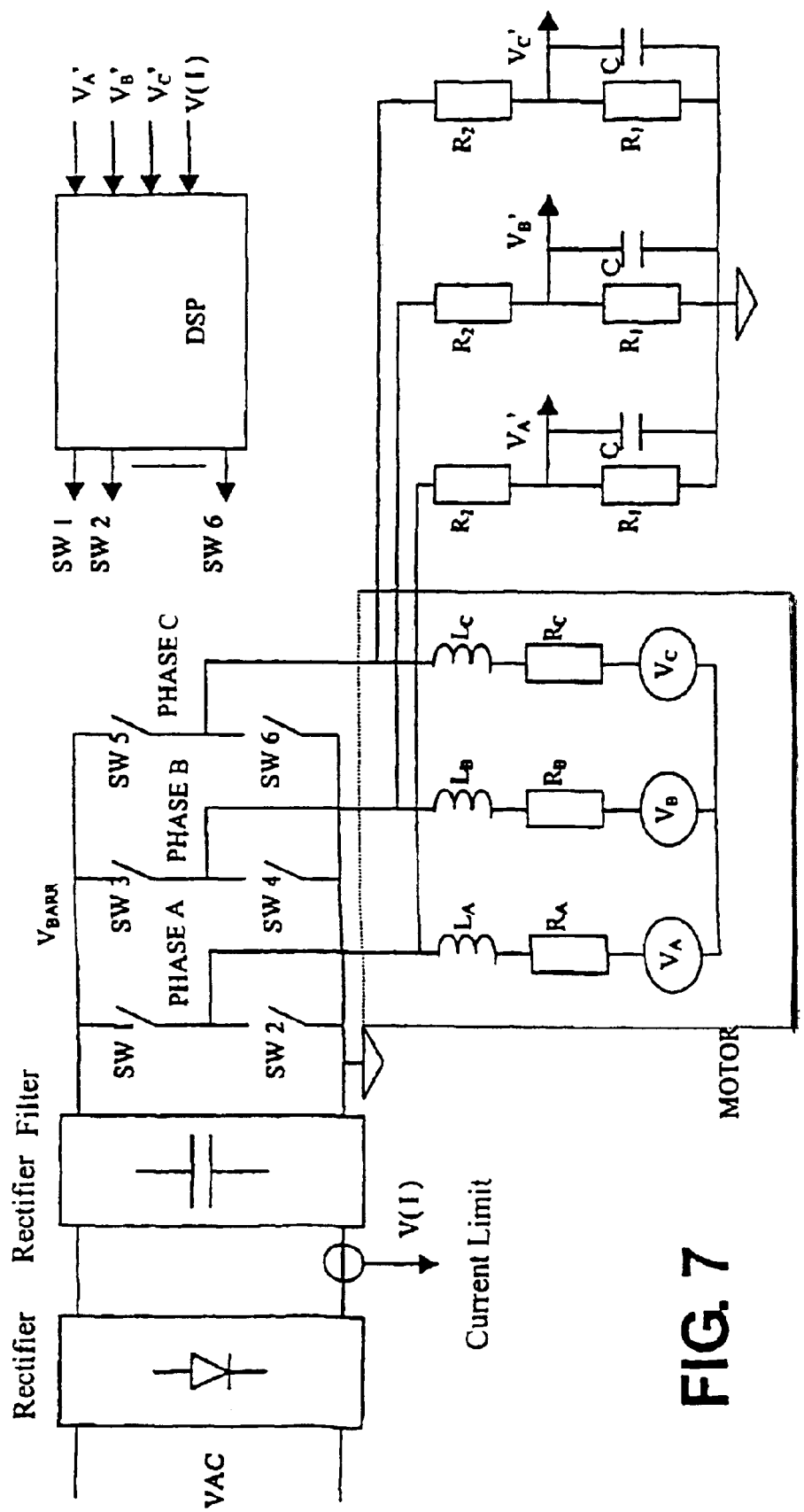
FIG. 7 represents the system used in the present invention, formed by a rectifying unit (40), a rectifying filter (50), a set of switches $SW_{2N}$ connected between a potential $V_{BUS}$ and the ground GND, a permanent-magnet Brushless DC type electric motor (20), a set of voltages meters $D_N$, a digital signal processor (10)+(30)

With reference to FIG. 7, the control system of the present invention is totally carried out by a microcontroller 10, an A/D converter provided with at least three inputs for reading the voltages $f_N$ in the meters $D_N$ that correspond to the voltages in the phases $F_N$. Evidently, the microcontroller 10 may be replaced by an equivalent device that has the same characteristics as a microcontroller associated to peripherals or else a digital signal processor.

Figure 2:
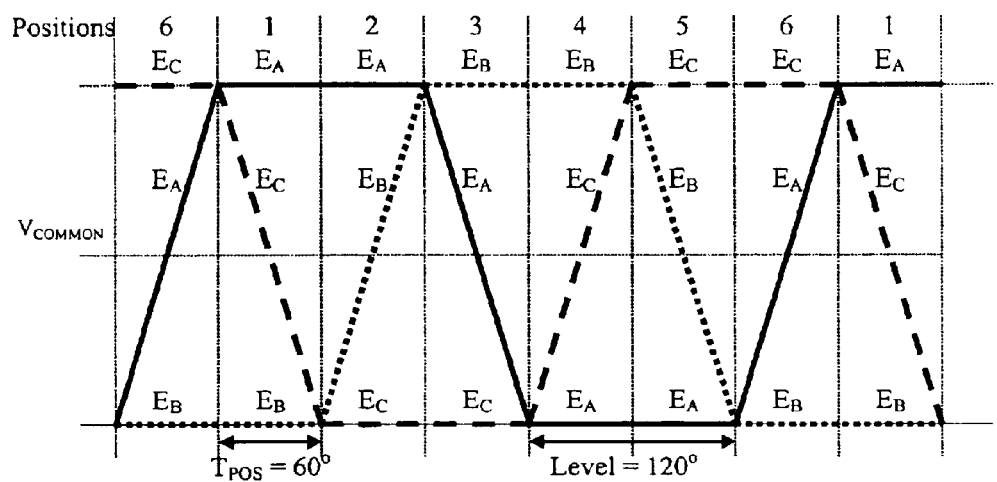
FIG. 2 represents an overlapping of the induced voltages ($E_N$) per phase, with trapezoidal shape and level of 120 electric degrees, and of the voltage at the common point ($V_{COMMON}$) of an ideal Brushless DC type permanent-magnet motor.

FIG. 2 shows the ideal overlapped wave shapes induced for a Brushless DC type three-phase 4-pole permanent-magnet motor, with trapezoidal voltage and level of 120 electric degrees. The level is defined here as being the angle in electric degrees at which the induced voltages remain at a higher value (positive level) or lower (negative level) and approximately constant. The following relationships between phase voltages for each step (position) of 60 electric degrees can be seen in this figure.

TABLE 1

Relationships between induced voltages in the motor

Position 1 ⇔ $E_A \geq E_C > E_B$
Position 2 ⇔ $E_A > E_B \geq E_C$
Position 3 ⇔ $E_B \geq E_A > E_C$
Position 4 ⇔ $E_B > E_C \geq E_A$
Position 5 ⇔ $E_C \geq E_B > E_A$
Position 6 ⇔ $E_C > E_A \geq E_B$ In this way, one can see that each position presents a well defined relationship between the induced voltages in the phases of the motor. For example, in the case of the actual position being the position 1, the position 2 should be started when the induced voltage in the phase C ($E_C$) equals the induced voltage in the phase B ($E_B$) (see FIG. 2) and this is lower than the induced voltage in phase A ($E_A$). In the same way, the position 3 should be started when the induced voltage in phase B ($E_B$) equals the induced voltage in phase A ($E_A$) and this is higher than the induced voltage in phase C ($E_C$).

Figure 3:
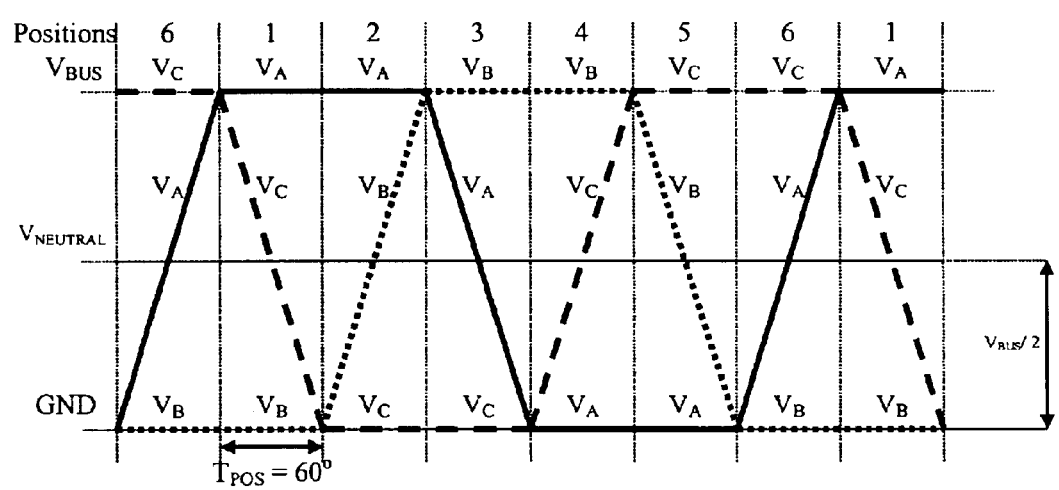
FIG. 3 represents an overlapping of the voltages $V_N$ and of the voltage at the common point ($V_{COMMON}$) of the motor indicated in FIG. 1, and in FIG. 7 for the event that the induced voltages ($E_N$) are trapezoidal with level of 120 electric degrees.

With reference to FIG. 3 and FIG. 7, one can observe, with respect to the ground of the circuit GND, the voltages $V_A$, $V_B$ and $V_C$ with at the common point of the motor $V_{COMMON}$:

$$V_A = E_A + V_{COMMON} \tag{1}$$

$$V_B = E_B + V_{COMMON} \tag{2}$$

$$V_C = E_C + V_{COMMON} \tag{3}$$

The voltage at the common point of the motor $V_{COMMON}$ for the case of the trapezoidal voltage with level of 120 degrees is half the value of the bus voltage;

$$V_{COMMON} = V_{BUS}/2. \tag{4}$$

Thus, the voltages $V_A$, $V_B$ and $V_C$ are symmetrically disposed between the bus voltage $V_{BUS}$ and the ground GND. If the variation of speed of the motor is effected by directly varying the bus voltage $V_{BUS}$, that is to say, without PWM modulation, and if the motor runs idle, these voltages will have the positive level value equal to the bus voltage $V_{BUS}$ and the negative level value equal to the ground value GND as illustrated in FIG. 3. One can see in this figure that the relationships between the voltages $V_A$, $V_B$ and $V_C$ are equal to the relationships between the induced voltages $E_A$, $E_B$, $E_C$ indicated in table 1. One can then write the following table.

TABLE 2

Relationships between the voltages $V_N$ in the phases of the motor

Position 1 ⇔ $V_A \geq V_C > V_B$
Position 2 ⇔ $V_A > V_B \geq V_C$
Position 3 ⇔ $V_B \geq V_A > V_C$
Position 4 ⇔ $V_B > V_C \geq V_A$
Position 5 ⇔ $V_C \geq V_B > V_A$
Position 6 ⇔ $V_C > V_A \geq V_B$ For a real system the obtention of induced voltages with a level of 120 degrees greatly restricts the project and construction of the motor. So, with reference to FIG. 4, one considers a generic voltage wave shape (level lesser than 120 degrees). In this case, the relationships between the induced voltages, for each position, indicated in Table 2, continue to be true. Note, however, that for the case of level of 120 degrees, at the instant of commutation, characterized by equality of two phases, this equality occurs with both phases at either maximum (positive level) or minimum value (negative level). On the other hand, in the case of the a level lower than 120 degrees, the equality between any two phases (instant of commutation) always occurs at a voltage difference 2H of the positive or negative level.

Figure 5:
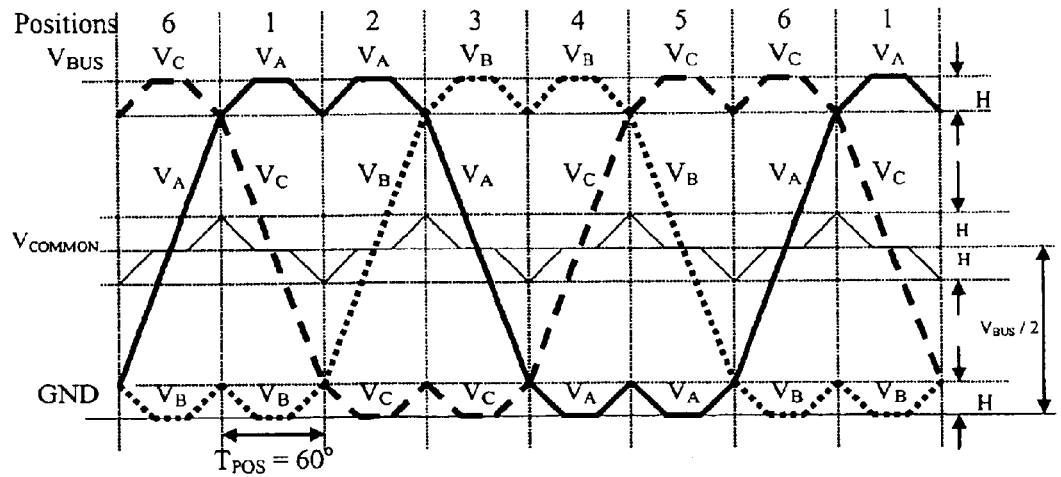
FIG. 5 represents an overlapping of the $V_N$ voltage and of the voltage at the common point ($V_{COMMON}$) indicated in FIG. 1 and in FIG. 7 for the event that the induced voltages ($V_N$) are trapezoidal with a level lower than 120 electric degrees.

In FIG. 5, one can observe the voltages $V_A$, $V_B$ and $V_C$ for the case of a level lower than 120 degree. The relationships of Table 2 continue to be true in this situation. Note that the voltage at the common point of the motor $V_{COMMON}$ does not remain fixed at the half of the bus voltage $V_{BUS}/2$ any longer. The reduced level causes an amplitude ripple H around this value $V_{BUS}/2$. This distortion in the voltage at the common point of the motor $V_{COMMON}$ causes the shape of the waves $V_N$ to be different from the shape of the induced voltages $E_N$. In this case, the equality between two of the voltages $V_N$ (instant of commutation) always occurs at a difference H of the positive or negative level and not 2H, as in the case of the induced voltages $E_N$.

For actuation of the motor, one cannot have simultaneous direct access to the N induced voltages $E_N$. Therefore, a direct utilization of the relationships of Table 1 is not possible. In addition, in order to read these voltages, it would be necessary to have access to the common point of the motor, which makes the sensing circuit and also the project of the motor expensive.

Even the voltages $V_N$ that are referenced to the ground GND cannot be simultaneously accessed, due to the inductances $L_N$ and resistances $R_N$ (see FIG. 7) of the winding of the motor. Thus, the relationships of Table 2 cannot be directly applied either. The sensing point used in the present invention are the feed inputs of the phases of the motor $F_N$ (see FIG. 7). In order to understand the sensing method using these inputs, FIG. 6 should be observed. This figure illustrates the wave shapes at the inputs $F_N$, obtained for the event that the level of the induced voltage of the motor is lower than 120 degree. On considers here the motor running idle and without modulation of the bus voltage $V_{BUS}$. Analyzing, as an example, the commutation from the position 2 to the position 3: when the motor is being actuated in the position 2, the switch $SW_1$ connecting the input $F_A$ to the bus voltage $V_{BUS}$, the switch $SW_6$ connects the input $F_C$ to the ground GND. The input $F_B$ is open. Therefore, there is no circulation of current in the resistance $R_B$ and in the inductance $L_B$ of this winding, and one has the voltage $V_B$ as the value of voltage at this input. Summing up, in the position 2, one has:

$F_A = V_{BUS}$ $F_B = V_B$ $F_C = 0(GND)$

The instant of commutation to the position 3 should occur when the voltage $V_B$ equals the voltage $V_A$. However, observing FIG. 6, one can see that at the instant of commutation, $V_A$ is equal to $V_{BUS}$—H (considering the motor virtually: idle). In this way, one can write the following relationship to be satisfied at the moment of commutation from the position 2 to the position 3:

Commutation $2 \rightarrow 3: F_B \geq F_A - H > F_C$

It follows that in the position 3:

$F_A = V_A$ $F_B = V_{BUS}$ $F_C = 0(GND)$.

The instant of commutation to the position 4 should occur when the voltage $V_A$ equals voltage $V_C$. Observing FIG. 6, one see that, at the instant of commutation $V_C$, GND+H is valid (considering the motor virtually idle). Thus, one can write the following relationship to be satisfied at the moment of commutation from the position 3 to the position 4:

Commutation $3 \rightarrow 4 F_B > F_C + H \geq F_A$

Extending the same reasoning for the other commutations, one reaches the following table:

TABLE 3

Relationships between the voltages $F_N$ at the instants of commutation

Commutation 6 → 1 ⇔ $F_A \geq F_C - H > F_B$
Commutation 1 → 2 ⇔ $F_A > F_B + H \geq F_C$
Commutation 2 → 3 ⇔ $F_B \geq F_A - H > F_C$
Commutation 3 → 4 ⇔ $F_B > F_C + H \geq F_A$
Commutation 4 → 5 ⇔ $F_C \geq F_B - H > F_A$
Commutation 5 → 6 ⇔ $F_C > F_A + H \geq F_B$ Comparing tables 2 and 3, one can see, as differences, the replacement of the voltages $V_N$ by the voltages $F_N$ and the inclusion of the parameter H. As the rotation of the motor varies, the amplitude of its induced voltages varies proportionally and, as a result, variation of the parameter H occurs. Therefore, once the parameter H is obtained for a rotation r0 ($H(r_0)$), its value for a rotation r whatsoever can be obtained by the expression:

$$H(r) = (r/r_0) \cdot H(r_0) \qquad (5)$$

Figure 4:
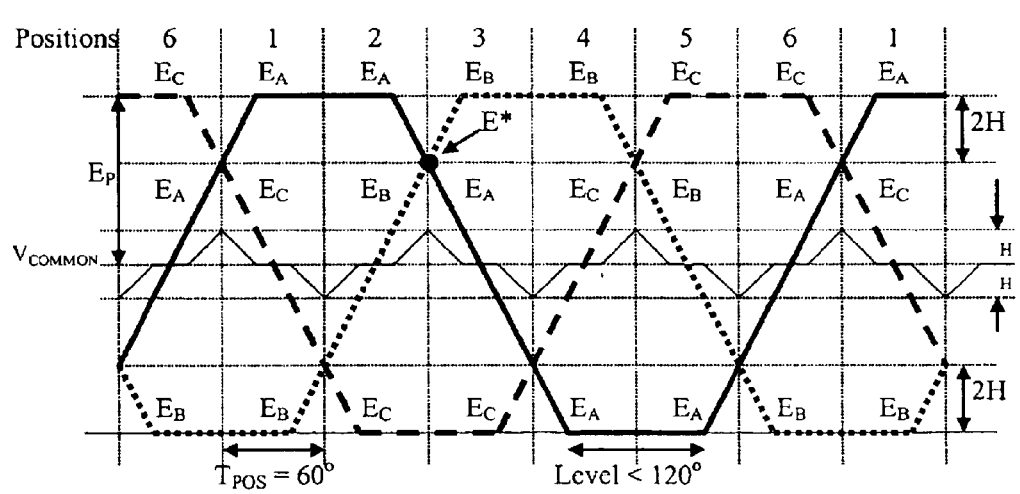
FIG. 4 represents an overlapping of the induced voltages ($E_N$) per phase, with trapezoidal shape and a level lower than 120 electric degrees, and of the voltage at the common point ($V_{COMMON}$) of a Brushless DC type motor; this Figure also identifies the obtention of the parameter H(r)

The obtention of the parameter H for a motor whatever may be made in a very simple way:

a) imposing a rotation $r_0$ to the motor, while keeping all the switches $SW_{2N}$ Off;

b) reading the induced voltages $E_N$; this is possible in this situation, since there will be no current through the resistances $R_N$ and inductances $L_N$ of the windings;

c) reading the parameter $H(r_0)$ as being half the difference between the peak value of the induced voltages $E_P$ and the voltage $E^*$ that corresponds to the voltage at which the reduced voltage module in two phases equal each other (see FIG. 4);

$$H(r_0) = (E_P - E^*)/2 \qquad (6)$$

d) using the expression (5) to obtain H(r) for a rotation whatever r.

Until now one has always considered the motor running idle (without load). In the case of load condition of the motor, it is necessary to increase the voltage applied to the phases of the motor in order to keep the speed constant. In this way, the maximum amplitudes of the voltages $V_N$ are lower than the bus voltage $V_{BUS}$ and their minimum amplitudes are higher than the ground GND. Thus, the value of H(r) should be increased for compensating this variation of voltage. This increase should be proportional to the value of the current that appears in the motor windings as a consequence of difference between bus voltage ($V_{BUS}$ and $V_N$ voltages). If one does not wish to utilize the value of current in the control algorithm, one can add the multiplication by a constant factor $k_i>1$, during the obtention of the parameter (H(r)) in the above-described step d for compensating the variations of current. Then one obtains:

$$H(r)=(r/r_0).H(r).K_i \quad (7)$$

In this way, with the motor running idle, one has always the instant of commutation a little advanced with respect to the correct instant. As the current of the motor increases the instant of commutation delays. The value of $K_i$ may be adjusted experimentally so as to guarantee the good functioning of the motor in the condition of maximum current. As an initial suggestion, one may use the value $K_i=1.3$.

If $K_i$ is adjusted at a value lower than 1, we have a reduction of the value H(r) and consequently there will be a delay in the instant of commutation. Therefore, besides being used for compensating for the increase of current, this constant may be used for enabling one to advance and delay the instant of commutation.

In order to the sensing algorithm, it is necessary to take into account the scale factor of the acquisition system indicated in FIG. 7. The meters $D_N$ present a scale factor $K_D$ given by $$K_D=R_1/(R_1+R_2) \quad (8)$$

In this way, at the input of the A/D converter 30 one connects the voltages $f_N$ given by:

$$f_N=K_D.F_N \quad (9)$$

The parameter H(r) too should be echeloned by the factor $K_D$.

By adding the scale factor $K_D$ to the Table 3 and replacing H with H(r), one reaches the following table to be used in the control algorithm:

TABLE 4

Relationships to be tested in the microcontroller for sensing position

Commutation 6 → 1 ⇔ $f_a \geq f_c - K_D.H(r) > f_b$
Commutation 1 → 2 ⇔ $f_a > f_b + K_D.H(r) \geq f_c$
Commutation 2 → 3 ⇔ $f_b \geq f_a - K_D.H(r) > f_c$
Commutation 3 → 4 ⇔ $f_b > f_c + K_D.H(r) \geq f_a$
Commutation 4 → 5 ⇔ $f_c \geq f_b - K_D.H(r) > f_a$
Commutation 5 → 6 ⇔ $f_c > f_a + K_D.H(r) \geq f_b$ In the final application the variation of the rotation of the motor may be obtained by directly varying the voltage $V_{BUS}$ (see FIG. 4), or by modulating the voltage applied to the motor by means of switches $SW_1$, $SW_2$, ... $SW_6$.

Figure 8:
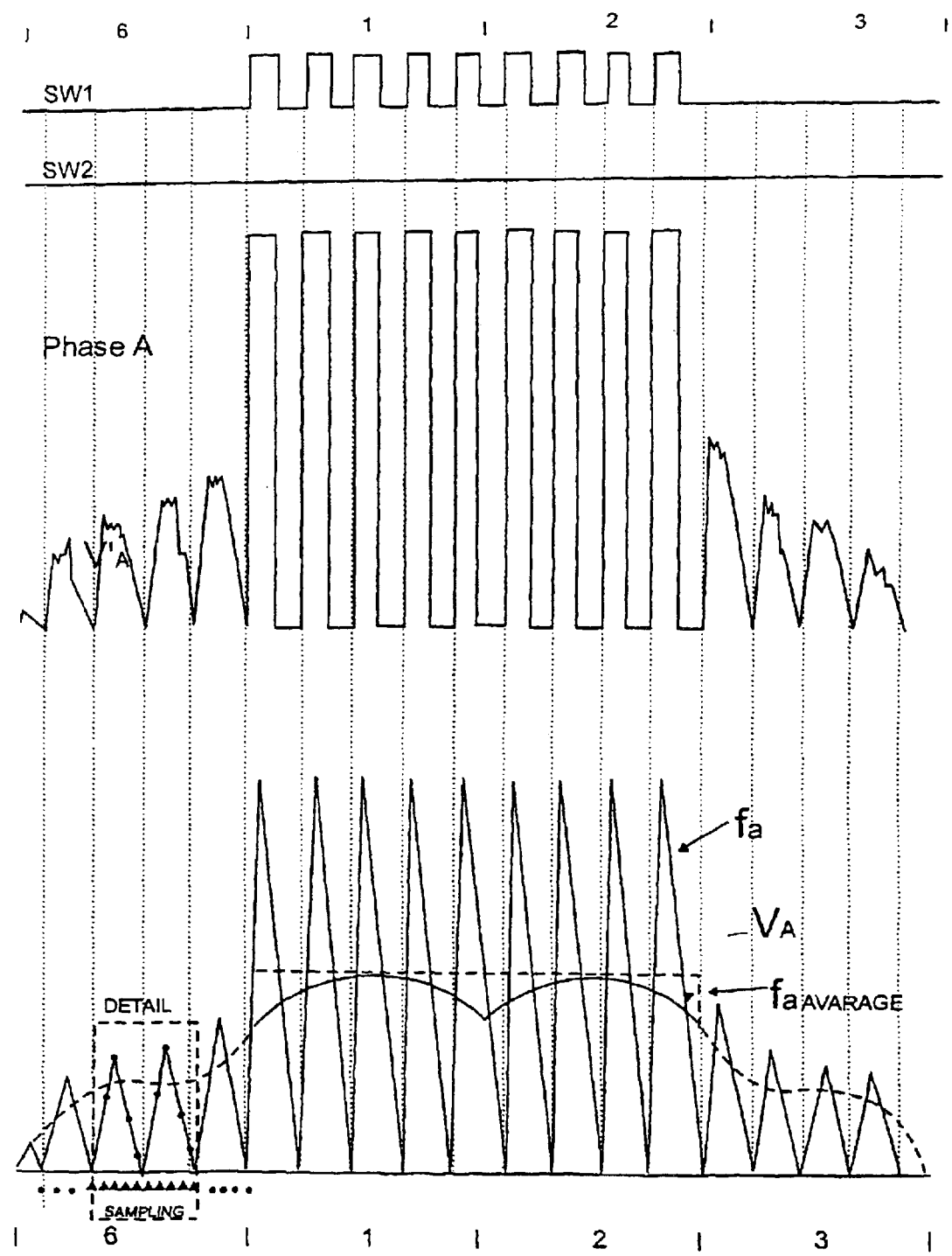
FIG. 8 represents the command signal of the switches $SW_{2N}$, the voltage on one of the phases of the motor $F_N$, the voltage to be sampled $f_N$, the voltage $V_N$ in the corresponding winding of the motor, and $f_{N\text{-}AVERAGE}$ result of the mathematical treatment of the samples, when a PWM actuation is used, further indicating the moments of sampling of the voltage $f_N$, in accordance with the system of the present invention.

For instance, in the case of the modulation being made by means of the switches $SW_1$, $SW_3$ and $SW_5$, the voltage in the phase A (and also in the remaining ones) will have the shape indicated in FIG. 8.

The filter $R_1C$ present in $D_N$ (see FIG. 4) softens the voltage variations in this phase. In this way, one obtains a wave shape similar to $f_a$ indicted in FIG. 6.

Here, in order to make the comparisons between the voltages observed in each phase, according to Table 4, it is necessary to filter totally the modulation present in $f_a$, $f_b$ and $f_c$. For this purpose, one calculates the mean of the voltages in each modulation period T. The sampling frequency used for measuring the voltage $f_N$ should be synchronized with the modulation frequency F.

In each modulation period, one always samples k values, equally spaced-apart, of each phase, that is to say, the sampling frequency is given by:

$$F_S=k.F \quad (10)$$

The sum of this k values divided by the number of samplings k represents the approximate average value of the voltage along the modulation period T. This operation is made at every sampling of the voltage $f_N$, enabling one to obtain the average value of $f_{N-AVERAGE}$, each cycle of sampling of the voltage $f_N$, that is, at a frequency k times as high as the modulation period PWM of the voltage on the phases of the motor.

In order to avoid the need for awaiting a complete period T to have the average value available, one has adopted the following procedure: at every sampling period $T_S=1/F_S$, one adds the sampled value to the previous samples k−1 and divides the result by k. Speaking in a more simple way, the technique proposed for determining the value of $f_{N-AVERAGE}$ consists of the arithmetical mean of the last k samples.

This technique brings about an optimum resolution in determining the correct moment of commutation for the motor, even for relatively low switching frequencies PWM.

Figure 9:
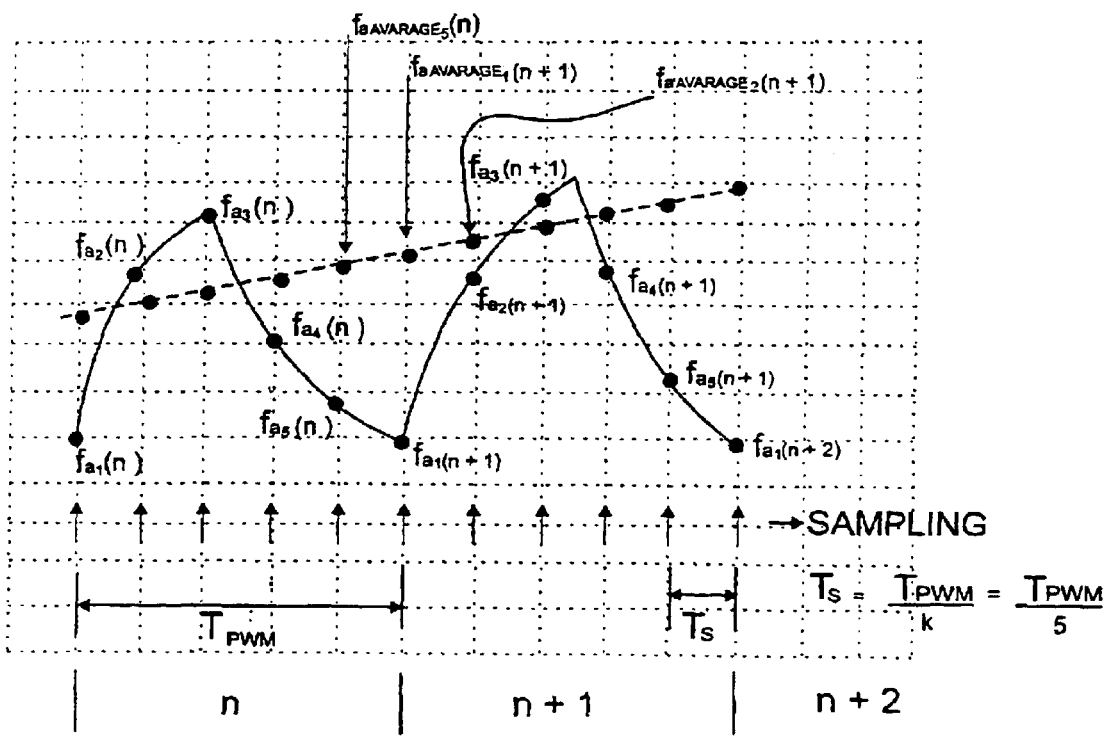
FIG. 9 represents in a detail the moments of sampling of the voltage $f_N$ in one of the phases of the motor, as well as the $f_{N\text{-}AVERAGE}$ result of the mathematical treatment of the samples of voltage $f_N$, for a system in which the PWM modulation is applied to the voltage on the phases of the motor.

As an example, FIG. 9 represents the enlargement of the detail indicated in FIG. 8. In this example, one considers 5 samples per modulation period (k=5). After the fifth sample of the modulation period n, one will have as average value:

$$f_{a-AVERAGE5}(n) = \frac{f_{a5}(n) + f_{a4}(n) + f_{a3}(n) + f_{a2}(n) + f_{a1}(n)}{5} \quad (11)$$

Entering in the modulation period n+1, the maximum value of $f_{a-AVERAGE}$ will be:

$$f_{a-AVERAGE1}(n+1) = \frac{f_{a1}(n+1) + f_{a5}(n) + f_{a4}(n) + f_{a3}(n) + f_{a2}(n)}{5} \quad (12)$$

and then:

$$f_{a-AVERAGE2}(n+1) = \frac{f_{a2}(n+1) + f_{a1}(n+1) + f_{a5}(n) + f_{a4}(n) + f_{a3}(n)}{5} \quad (13)$$

In this way, at every sampling period $T_S$, one has the value of available.

It is important to note that the cut frequency of the filter $R_1C$ should be lower than half the sampling frequency ($F_c<F_S/2$), thus respecting the Nyquist's criterion. As a good estimate one can use ¼ of the sampling frequency of less. For the sampling frequency one can utilize, for example, 4*F or more, in order to have a good average. Hence, as a suggestion:

$$F_S \leq 4.F \quad (14)$$

$$F_c \leq 2.F_S \quad (15)$$

Figure 6:
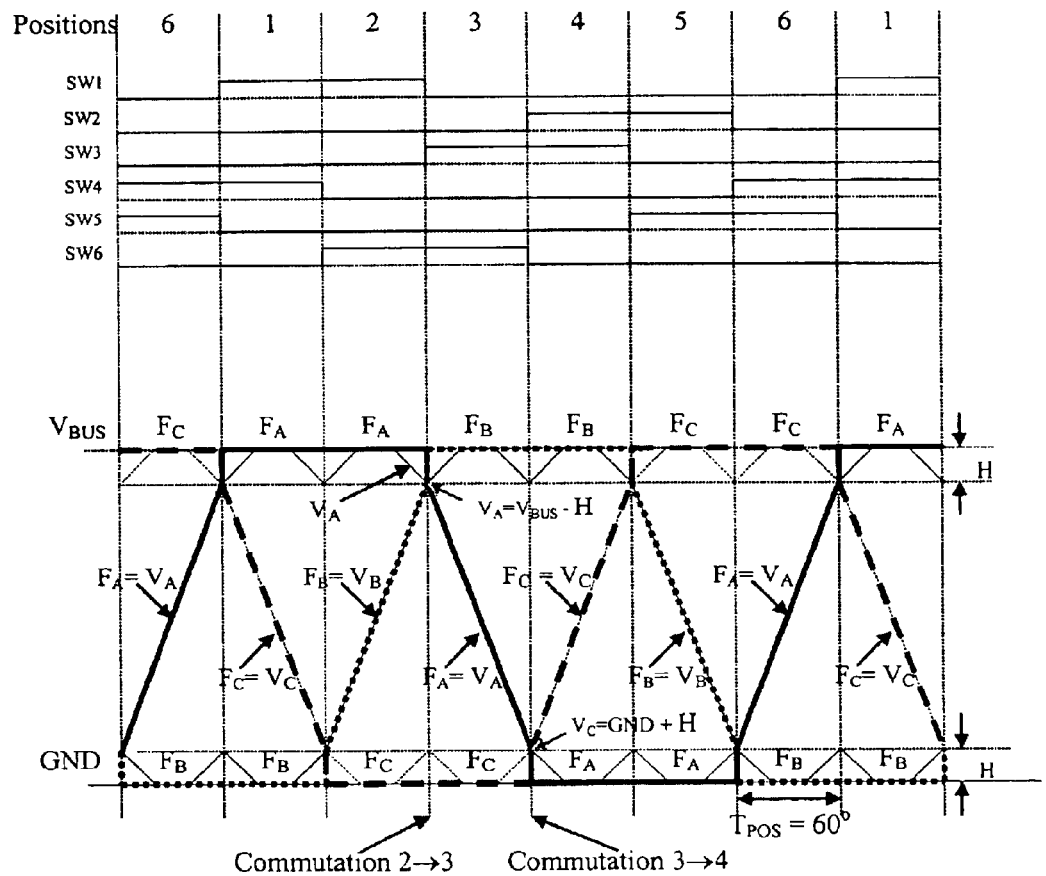
FIG. 6 represents the command signal of the switches $SW_{2N}$ to each position, the voltages at the inputs of the phases of the motor ($F_N$) and indicates the instants of commutation of position 2 to position 3 and from position 3 to position 4.

In FIG. 8, the dashed line indicates the average value $f_{a\text{-}AVERAGE}$ obtained with the proposed technique. Note that the shape of $f_{a\text{-}AVERAGE}$ in FIG. 6 is the same of $F_A$ in FIG. 6, where there is no modulation PWM of the voltage on the phase of the motor.

It is then found that, with the proposed technique, the effect of the PWM modulation on the voltages of the phases is filtered virtually in its entirety, without presenting a significant disadvantage between the actual value of the mean and the calculated values, thus enabling one to use the relationships indicated in Table 4, where then the average values (see Table 5) for determining the increase of commutation of the motor.

TABLE 5

Final table of comparisons to be used in the algorithm

Commutation 6 → 1 ⇔ $f_{a\text{-}AVERAGE} \geq f_{c\text{-}AVERAGE} - K_D.H(r) > f_{b\text{-}AVERAGE}$
Commutation 1 → 2 ⇔ $f_{a\text{-}AVERAGE} > f_{b\text{-}AVERAGE} + K_D.H(r) \geq f_{c\text{-}AVERAGE}$
Commutation 2 → 3 ⇔ $f_{b\text{-}AVERAGE} \geq f_{a\text{-}AVERAGE} - K_D.H(r) > f_{c\text{-}AVERAGE}$
Commutation 3 → 4 ⇔ $f_{b\text{-}AVERAGE} > f_{c\text{-}AVERAGE} + K_D.H(r) \geq f_{a\text{-}AVERAGE}$
Commutation 4 → 5 ⇔ $f_{c\text{-}AVERAGE} \geq f_{b\text{-}AVERAGE} - K_D.H(r) > f_{a\text{-}AVERAGE}$
Commutation 5 → 6 ⇔ $f_{c\text{-}AVERAGE} > f_{a\text{-}AVERAGE} + K_D.H(r) \geq f_{b\text{-}AVERAGE}$ A strong point in the use of the filtering technique proposed for observing the induced voltages in the phases of the motor is that this process enables one to monitor the position of the rotor k times at every modulation period PWM of the voltage applied on the phases of the motor. Thus, even in the event of using a low modulation frequency (Ex. 1 KHz or less) one still achieved a good resolution during the sensing of the position of the rotor and of the adequate moment of commutation.

Figure 10A:
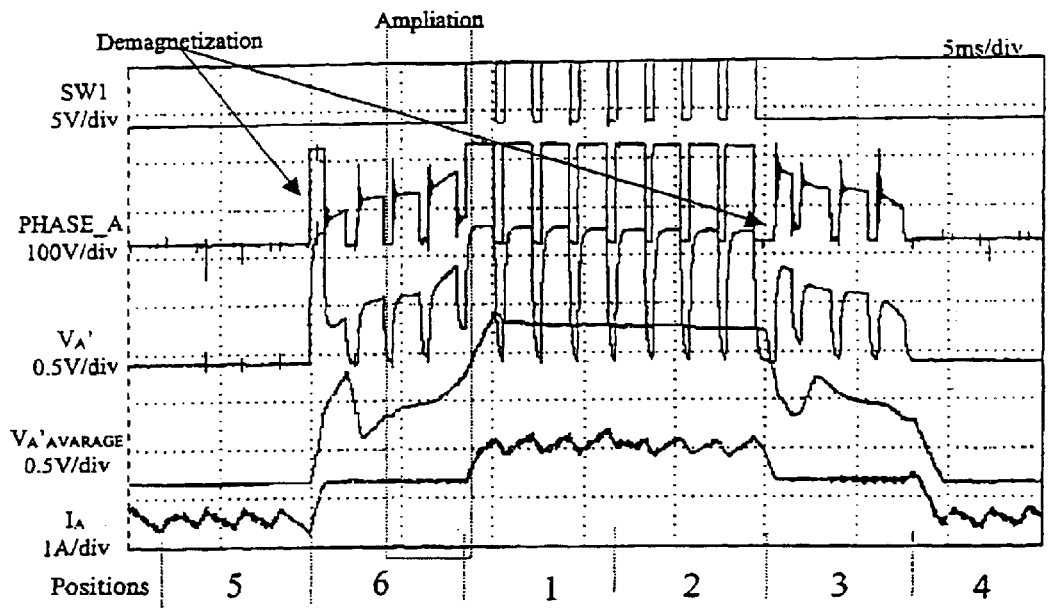
FIG. 10 represents (a) the experimental wave shapes for a motor with a concentrated windings 6-grooves stator—triphasic and with 4 poles, as well as (b) an enlargement showing the instant of sampling of the phase A and the mean obtained by the mathematical treatment of the samples.
Figure 10B:
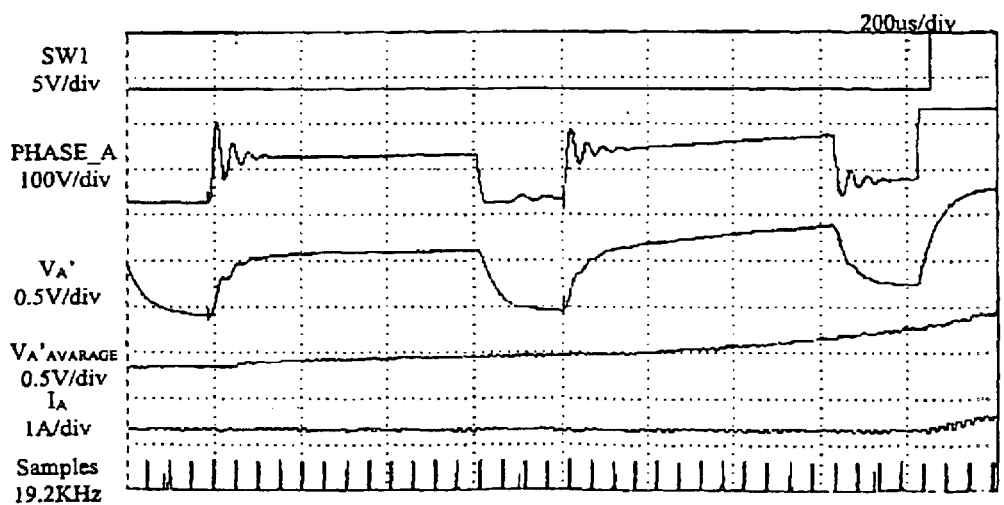

As an example, consider FIG. 10a. This figure shows the experimental results achieved in controlling a Brushless DC type 6-groove permanent-magnet motor—4 poles, F being= 1.2 KHz, $F_c$=3.3 KHz, $F_S$=16*F=19.2 KHz. The rotation is 1500 rpm. In FIG. 10b one has the enlargement of 2 cycles of PWM, and the instants of sampling of $f_a$ are also indicated. As commented previously, although the modulation frequency is low, the mathematical filtering technique proposed here enables one to monitor the change of position 16 times at every period T. In this way, one has an excellent resolution in sensing the position. It is important to note that the amplitudes of the signals shown in FIG. 10a are at different scales, serving only as a qualitative reference.

With reference to FIG. 10, the voltage peak observed in the phase A after the commutation 5→and the absence of voltage after the commutation 2→3 characterize the period of demagnetization of this phase. The demagnetization is the period required for the occurrence of extinction of the current circulating in a determined phase, after completion of the period of application of the current in this phase, that is to say, after the commutation from a position x to the next position x+1. The demagnetization causes a distortion in the wave shape of the voltage observed at the terminals of the motor. In order to prevent this distortion from affecting the sensing of the position, there is a certain delay period TD after each commutation, wherein the commutation between the voltages $F_N$ is not carried out. One advantage of the method of the present invention in comparison with the traditional method of detecting the zero of the induced voltages is that, in the method of detecting the zero, the demagnetization period cannot exceed 30 electric degrees, since in this case one cannot detect the zero the occurs exactly after 30 degrees. In the method of the present invention, the demagnetization may exceed 30 degrees without causing any problem at all in the sensing, and for this purpose it is enough to adjust the delay period $T_D$ conveniently.

It is important to note that, both the filter $R_1C$ and the process of mathematical calculation of the mean cause a delay of the result. This delay, however, even if it is short and has little influence, can be compensated for by merely adjusting the parameter H(r).

If the modulation PWM is 100%, the voltage $V_{BUS}$ will be continuous, and it is not necessary to carry out the sampling; in this particular case, it is possible to carry out the position sensing by simply observing the voltages in the phases and then comparing these values according to Table 4. The sampling rate in situations in which the sampling is less than 100% should be adequate for guaranteeing a good resolution in the maximum rotation of the motor. At this rotation the electric frequency of the motor will be given by:

$$F_{EL} = \frac{n \cdot p}{60} = \frac{4500.2}{60} = 150 \text{ Hz} \quad (16)$$

wherein:
n=rotation of the motor in rpm; and
p=number of pairs of poles.

As each electric period presents 6 different positions, one will have a minimum period per position for this motor of:

$$T_{POS\ MINIMUM} = \frac{1}{6.150\ \text{Hz}} = 1.11\ \text{ms} \quad (17)$$

Thus, a good value to be used for maintaining a good resolution at the maximum rotation is of 10 samplers per position. Then one achieves the following value for the sampling frequency:

$$F_S = \frac{10}{T_{POS\ MINIMUM}} = 9.09\ \text{kHz} \quad (18)$$

Evidently, the object of the present is applicable to motors of construction similar to that of permanent-magnet motors and that have any number whatever of poles and phases, it being necessary only to conform it to the particular application.

A preferred embodiment having been described, it should be understood that the scope of the present invention embraces other possible variations, being limited only by the contents of the accompanying claims, which include the possible equivalents.

What is claimed is:

1. A method of controlling an electric motor of n phases ($F_N$), the electric motor comprising:
    a microcontroller;
    a set of voltage meters ($D_N$) associated to the microcontroller;
    a set of switches ($SW_{2N}$) connected to an electric bus voltage ($V_{BUS}$), and associated to the microcontroller;
    the microcontroller selectively actuating at least one pair of switches ($SW_{2N}$), applying a bus voltage ($V_{BUS}$) to at least two phases ($F_N$) of the motor, wherein the method comprises the following steps:

the microcontroller reading, by means of the set of meters ($D_N$), the signals of the electric voltages ($f_N$) corresponding to the feed voltages in the phases ($F_N$) of the motor;

obtaining an average value ($f_{N\text{-}AVERAGE}$) by the mean of the values of the signals of the electric voltages ($f_N$), the voltages ($f_N$) being obtained by period sampling (Ts), equally distributed within a period of time (T); and the microcontroller comparing the voltages ($f_N$) corresponding to the voltages in the phases ($F_N$) with pre-established parameters and actuates the switches ($SW_{2N}$) as soon as the pre-established parameters are achieved by the voltages ($f_N$), wherein the step of comparing the voltages ($f_N$) comprises the step of comparing the average value ($f_{N\text{-}AVERAGE}$) of the voltage values ($f_N$) sampled in each meter ($D_N$) with the mean of the voltage values ($f_{N\text{-}AVERAGE}$) sampled in each of the other meters ($D_N$), the average value ($f_{N\text{-}AVERAGE}$) of one of the phases being summed or subtracted from a parameter H(r) proportional to the rotation of the motor.

2. A method according to claim 1, wherein, prior to the step of reading the voltages ($f_N$), the values are converted by an A/D converter.

3. A method according to any one of claims 1 or 2, wherein:

the switches ($SW_{2N}$) comprise switches ($SW_1$) to ($SW_6$) and the meter ($D_N$) comprises meters ($D_A$) to ($D_C$), and the step of comparing the voltages ($f_N$) corresponding to the voltages in the phases ($F_N$);

a first combination of switches ($SW_1$) and ($SW_4$) is actuated when the average value of the voltage ($f_{a\text{-}AVERAGE}$) in the meter ($D_A$) is higher or equal to the average value of the voltage ($f_{c\text{-}AVERAGE}$) in the meter ($D_C$) subtracted from the parameter H(r), and the average value of the voltage ($f_{c\text{-}AVERAGE}$) in the meter (DC) subtracted from the parameter H(r) is higher than the average value of voltage ($f_{b\text{-}AVERAGE}$) in the meter ($D_B$);

a second combination of switches ($SW_1$) and ($SW_6$) is actuated when the average value of the voltage ($f_{a\text{-}AVERAGE}$) in the meter ($D_A$) is higher than the average value of the voltage ($f_{b\text{-}AVERAGE}$) in the meter ($D_B$) added to the parameter H(r), and the average value of the voltage ($f_{b\text{-}AVERAGE}$) in the meter ($D_B$) added to the parameter H(r) is higher or equal to the average value of the voltage ($f_{c\text{-}AVERAGE}$) in the meter ($D_C$);

a third combination of switches ($SW_3$) and ($SW_6$) is actuated when the average value of the voltage ($f_{b\text{-}AVERAGE}$) in the meter ($D_B$) is higher or equal to the average value of the voltage ($f_{a\text{-}AVERAGE}$) in the meter ($D_A$) subtracted from the parameter H(r), and the average value of the voltage ($f_{a\text{-}AVERAGE}$) in the meter ($D_A$) subtracted from the parameter H(r) is higher than the average value of the voltage ($f_{c\text{-}AVERAGE}$) in the meter ($D_C$);

a fourth combination of switches ($SW_2$) and ($SW_3$) is actuated when the average value of the voltage ($f_{b\text{-}AVERAGE}$) in the meter ($D_B$) is higher than the average value of the voltage ($f_{c\text{-}AVERAGE}$) in the meter ($D_C$) added to the parameter H(r), and the average value of the voltage ($f_{c\text{-}AVERAGE}$) in the meter ($D_C$) added to the parameter H(r) is higher or equal to the average value of the voltage ($f_{a\text{-}AVERAGE}$) in the meter ($D_A$);

a fifth combination of switches ($SW_2$) and ($SW_5$) is actuated when the average value of the voltage ($f_{c\text{-}AVERAGE}$) in the meter ($D_C$) is higher or equal to the average value of the voltage ($f_{b\text{-}AVERAGE}$) in the meter ($D_B$) subtracted from the parameter H(r), and the average value of the voltage ($f_{b\text{-}AVERAGE}$) in the meter ($D_B$) subtracted from the parameter H(r) is higher than the average value of the voltage ($f_{a\text{-}AVERAGE}$) in the meter ($D_A$); and a sixth combination of switches ($SW_4$) and ($SW_5$) is actuated when the average value of the voltage ($f_{c\text{-}AVERAGE}$) in the meter ($D_C$) is higher than the average value of the voltage ($f_{a\text{-}AVERAGE}$) in the meter ($D_A$) added to the parameter H(r), and the average value of the voltage ($f_{a\text{-}AVERAGE}$) in the meter ($D_A$) added to the parameter H(r) is higher or equal to the average value of the voltage ($f_{b\text{-}AVERAGE}$) in the meter ($D_B$).

4. A method according to claim 3, wherein, when the combinations of switches ($SW_1$) to ($SW_6$) are actuated, the parameter H(r) is the result of the multiplication of the parameter (H(r)) by a scale factor ($K_D$).

5. A method according to claim 4, wherein the step of comparing the mean ($f_{N\text{-}AVERAGE}$) of the values of voltages ($f_N$) sampled in each meter ($D_N$) with the mean of the values of voltages ($f_{N\text{-}AVERAGE}$) sampled in each of the other meters ($D_N$) is carried out at each cycle of sampling (Ts) of the voltages ($f_N$) in the meters ($D_N$).

6. A method according to claim 5, wherein the sampling of the voltages ($f_N$) in the meters ($D_N$) corresponds to the voltage in the phases of the motor ($F_N$) is carried out k times within the period of time (T).

7. A method according to claim 6, wherein the period of time (T) is equal to the period of modulation PWM in the phases of the motor when this modulation PWM is applied.

8. A method according to claim 7, wherein the average value ($f_{N\text{-}AVERAGE}$) of the voltage sampled in each of the meters ($D_N$) of voltage ($f_N$) of the phases of the motor is obtained by calculating the arithmetic mean of the last k samples.

9. A method according to claim 8, wherein the value $H(r_0)$ is the result of half of the difference between the maximum value of an induced voltage (Ep) observed in a phase, at a rotation ($r_0$) of the motor, and a voltage (E*) observed in two phases, when these values of the induced voltage ($E_N$) in the two phases are equal to each other.

10. A method according to claim 9, wherein the parameter (H(r)) to be added or subtracted from the average value ($f_{N\text{-}AVERAGE}$) of the voltage sampled in the meter ($D_N$) of voltage of one of the phases is equal to the ratio between a given rotation (r) and the rotation ($r_0$) multiplied by the value $H(r_0)$ measured in the rotation ($r_0$) and multiplied by the adjustment constant ($k_i$).

11. A method according to claim 10, wherein the use of the parameter H(r) is proportional to the rotation (r) to dephase the instant of actuation of a new combination of switches ($SW_{2N}$).

12. A system for controlling an electric motor of N phases comprising:

a microcontroller, comprising memory; and a set of switches ($SW_{2N}$) connected to an electric bus voltage ($V_{BUS}$) and associated to the microcontroller;

the microcontroller being arranged to selectively actuate at least one pair of switches ($SW_{2N}$), applying a bus voltage ($V_{BUS}$), to at least two phases ($F_N$) of the motor, wherein the system comprises a set of voltage meters ($D_N$) associated to the microcontroller, the set of meters ($D_N$) being connected to the feed inlets of the phases ($F_N$) of the motor;

wherein the microcontroller comprises, stored in its memory, pre-established relations between the voltages ($f_N$), and being capable of comparing the value measured by the meters ($D_N$) with the pre-established relations of the voltages ($f_N$) measured by the set of meters ($D_N$); and the microcontroller being arranged to compare the average value ($f_{N\text{-}AVERAGE}$) of the voltage values ($f_N$) sampled in each meter ($D_N$) with the mean of the voltage values ($f_{N\text{-}AVERAGE}$) sampled in each of the other meters ($D_N$), the average ($f_{N\text{-}AVERAGE}$) of one of the phases being summed or subtracted from a parameter (H(r)) proportional to the rotation of the motor.

13. A system according to claim 12, wherein an A/D converter is associated to the microcontroller to convert the signals read by the set of meters ($D_N$).

14. A system according to claim 12 or 13, wherein the set of meters ($D_N$) comprises a resistive divider associated to a capacitor, so as to form a RC filter presenting a scale factor ($K_D$) of relationship between the voltage ($f_N$) and the voltage in the phase ($F_N$).

15. A system according to claim 14, wherein a microcontroller reads the value of the voltage ($f_N$) by means of a sampling frequency (Ts) k times as high as the modulation frequency PWM.

16. An electric motor of N phases comprising a system capable of synchronizing the phase currents with the induced voltages, which includes a microcontroller, a set of switches ($SW_{2N}$) connected to a bus voltage ($V_{BUS}$) and associated to the microcontroller, the microcontroller selectively actuating at least one pair of switches ($SW_{2N}$), applying a bus voltage ($V_{BUS}$) to at least two phases ($F_N$) of the motor, comprising a set of voltage meters ($D_N$) associated to the microcontroller, the set of meters ($D_N$) being connected to the feed inlets of the phases ($F_N$) of the motor;

the microcontroller comprising, stored in its memory, pre-established relationships between the voltages ($f_N$) and being capable of comparing the value measured by the meters ($D_N$) with the pre-established relations and actuating at least one more pair of switches ($SW_{2N}$) in function of the relation of the voltages ($f_N$) measured by the set of meters ($D_N$); and the microcontroller being arranged to compare the average value ($f_{N\text{-}AVERAGE}$) of the voltage values ($f_N$) sampled in each meter ($D_N$) with the mean of the voltage values ($f_{N\text{-}AVERAGE}$) sampled in each of the other meters ($D_N$), the average value ($f_{N\text{-}AVERAGE}$) of one of the phases being summed or subtracted from a parameter H(r) proportional to the rotation of the motor.

* * * * *